Nov. 17, 1936.  R. D. LACOE  2,061,077
ICE CREAM MAKING ATTACHMENT FOR MECHANICAL REFRIGERATORS
Filed Sept. 26, 1934   2 Sheets-Sheet 1
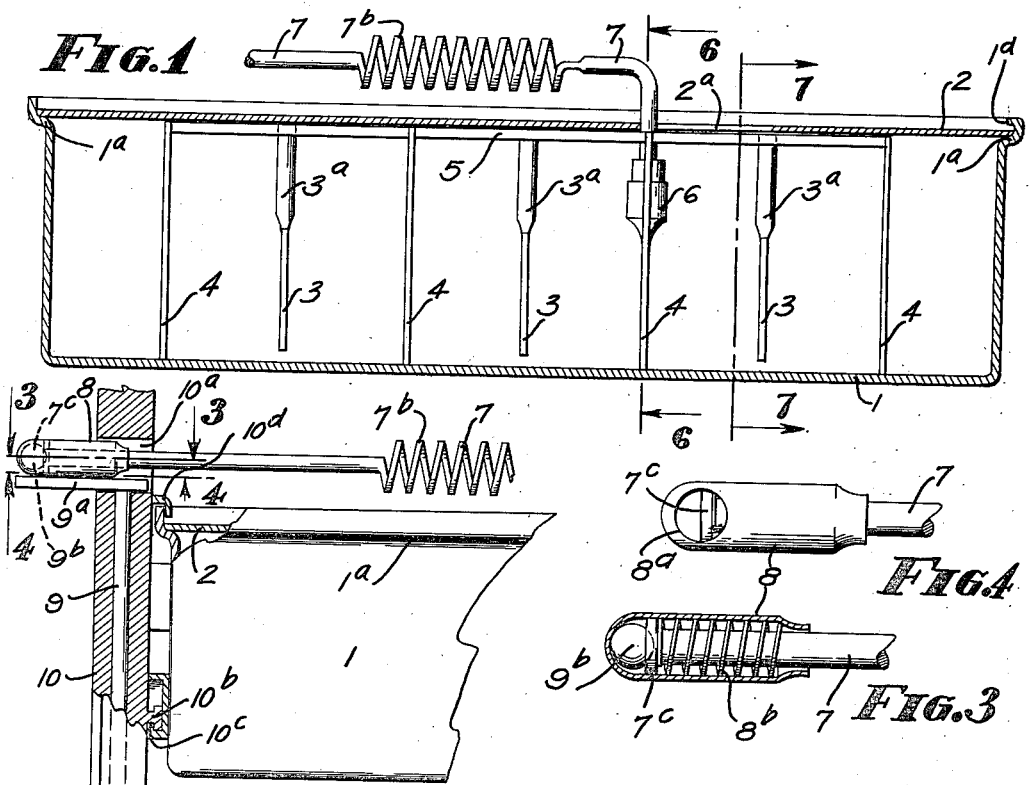
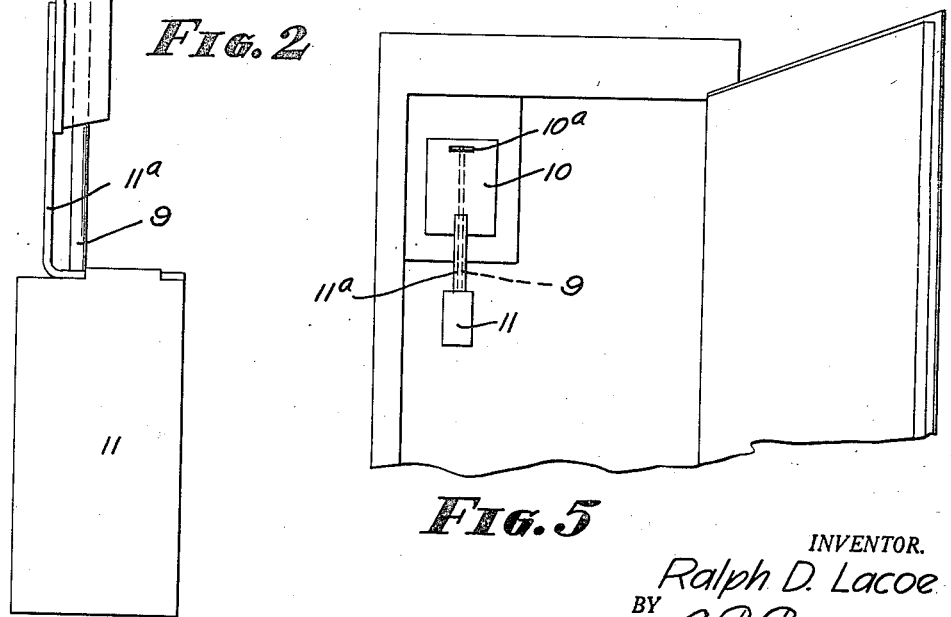
INVENTOR.
Ralph D. Lacoe
BY
A.B.Bowman
ATTORNEY Nov. 17, 1936.  R. D. LACOE  2,061,077
ICE CREAM MAKING ATTACHMENT FOR MECHANICAL REFRIGERATORS
Filed Sept. 26, 1934   2 Sheets—Sheet 2

INVENTOR.
Ralph D. Lacoe
BY A.B.Bowman
ATTORNEY

UNITED STATES PATENT OFFICE 2,061,077

ICE CREAM MAKING ATTACHMENT FOR MECHANICAL REFRIGERATORS

Ralph D. Lacoe, San Diego, Calif.

Application September 26, 1934, Serial No. 745,579

11 Claims. (Cl. 259—113)

My invention relates to attachments for stirring ice cream while the cream is being frozen in mechanical refrigerators, and the objects of my invention are:

First, to provide a means for thoroughly stirring the cream while it is freezing;

Second, to provide an attachment to be used in the conventional ice making compartment of a mechanical refrigerator for freezing ice cream and stirring the same while it is being frozen therein;

Third, to provide an attachment of this class in which the cream is stirred near the bottom of the receptacle where it freezes first, therefore causing it to freeze smoothly throughout the whole of the cream enclosing receptacle;

Fourth, to provide an attachment of this class in which the stirring is controlled by a motor which is positioned outside of the freezing compartment;

Fifth, to provide an attachment of this class in which the motor and ice making compartment door are quickly detached from the ice cream receptacle;

Sixth, to provide an attachment of this class in which the connection between the motor and the stirring apparatus is resilient and therefore provides means for operating on shorter strokes for some time after the cream thickens from freezing;

Seventh, to provide an apparatus of this class in which there are provided stationary and shiftable paddle members for thoroughly mixing the cream while it is being frozen, thus providing an ice cream of very fine texture;

Eighth, to provide an attachment of this class which is very simple and economical of construction, easy and economical of operation, and which will not readily deteriorate or get out of order.

Figure 6:
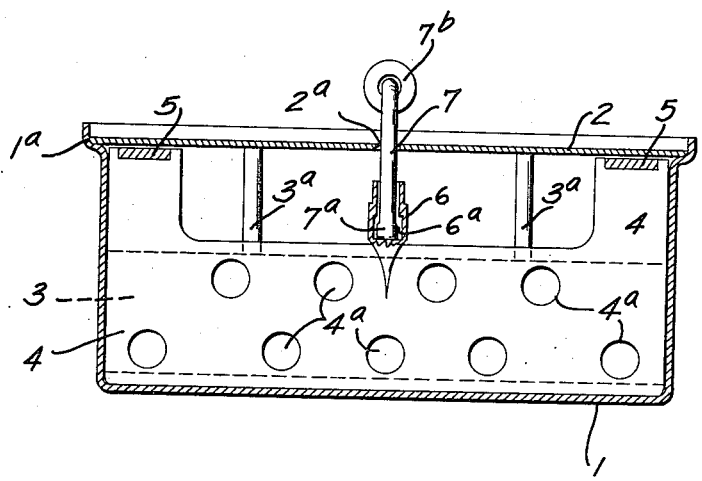
Figure 7:
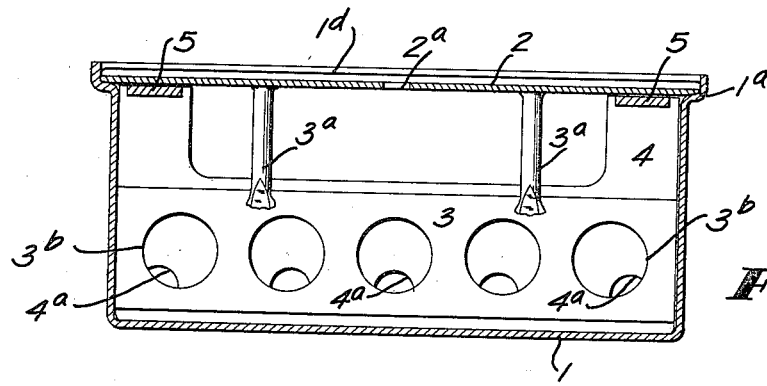
Figure 8:
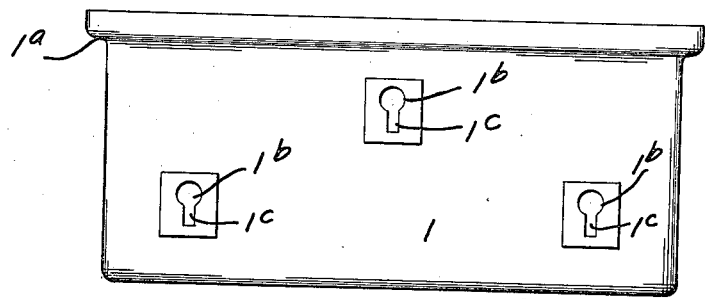

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view of the receptacle with the stirring means mounted therein taken through the middle portion of the receptacle showing certain parts and portions in elevation to facilitate the illustration; Fig. 2 is a side elevational view of the ice making compartment door, motor, and a fragmentary portion of the receptacle showing some of the parts and portions broken away and in section to facilitate the illustration; Fig. 3 is an enlarged detailed sectional view of the pitman connecting member 8 through 3—3 of Fig. 2; Fig. 4 is an enlarged lower side elevational view from the line 4—4 of Fig. 2; Fig. 5 is a front elevational view of a mechanical refrigerator with the door open showing my apparatus positioned in connection with a conventional ice making compartment of the mechanical refrigerator; Fig. 6 is a transverse sectional view of the ice cream making receptacle shown through 6—6 of Fig. 1; Fig. 7 is a similar view through 7—7 of Fig. 1, and Fig. 8 is a front elevational view of the receptacle with the ice making compartment door removed.

Similar characters of reference refer to similar parts and portions throughout the several views of the drawings.

The receptacle 1, receptacle cover 2, stationary paddle members 3, shiftable paddle members 4, shiftable paddle member supports 5, pitman connection socket 6, spring pitman 7, pitman connecting member 8, crankshaft 9, ice making compartment door 10, and motor casing 11, constitute the principal parts and portions of my ice cream making attachment for mechanical refrigerators.

The receptacle 1 is the cream receptacle and is preferably rectangularly shaped and adapted to fit into the ice making compartment of conventional mechanical refrigerators and may be any depth desired; it is however preferable to have it somewhat deeper than the conventional receptacles in the ice making compartment of the conventional refrigerator, and it is preferably made of a material that will readily conduct the refrigeration through the walls thereof. It is provided at its upper side with an offset flanged portion 1a into which is adapted to rest the cover member 2 which rests on the horizontal offset portion, as shown best in Figs. 1, 6 and 7 of the drawings. However, it will be noted that the upper edge of said flanged portion is turned inwardly at the one end of the receptacle, as shown at 1d, Fig. 1 of the drawings, to hold the cover 2 in place. Secured to and depending from the lower side of this cover member 2 are a plurality of paddle supporting stems 3a upon the lower ends of which are supported the stationary paddles 3 which extend transversely across the receptacle 1 near the bottom side thereof and spaced slightly from the bottom, as shown best in Figs. 1 and 7 of the drawings. Each of these paddle members 3 is provided with a plurality of large perforations 3b which are adapted to permit the cream to pass through to a certain extent; thus the cream is permitted to flow to a certain extent through the perforations 3b and between the lower side of the paddle members 3 and the bottom of the receptacle 1.

Mounted so as to reciprocate between the members 3 and between the end member 3 and the end of the receptacle is a plurality of shiftable paddle members 4 which are adapted to ride on the bottom of the receptacle 1 at their lower edges and are supported and secured in their relation to each other by means of supports 5 one at each side, as shown best in Figs. 6 and 7 of the drawings, and to which the paddle members 4 are rigidly secured, it being noted that these paddle members 4 are cut away at the middle portion, as shown best in Figs. 6 and 7 of the drawings. Each of these shiftable paddle members are provided with perforations 4a which are adapted to permit a limited quantity of the cream to pass through with the shiftable movement of the paddle members 4, while some of it would pass over at the upper edges at the middle portion. It will be noted that these paddle members 4 are adapted to shift from one stationary paddle 3 to the other for thoroughly agitating and mixing the cream in the receptacle. One of these paddle members 4 is provided with a pitman connection socket 6 which is provided with an enlarged recess 6a adapted to receive an enlarged portion 7a on the spring pitman 7, it being noted however that the portion 7a may be readily removed by upward movement of the member 7 from the socket member 6. The pitman member 7 in its vertical portion is adapted to reciprocate in a slot 2a in the cover member 2. This pitman 7 is provided with a spring portion 7b which provides resilient action of this pitman so that when the cream begins to harden upon freezing or when fruit is used in the cream for flavoring, the pitman will still operate without stalling the motor for some time by shorter strokes of the paddle members 4.

This pitman member 7 is provided on its opposite end from the enlarged portion 7a with another enlarged portion 7c, as shown best in Figs. 3 and 4 of the drawings. This enlarged portion 7c is adapted to reciprocate in the connecting member 8, there being provided an opening 8a in its normally lower side adapted to receive this enlarged knob portion 9b of the crankshaft 9. Mounted against the opposite side of the enlarged portion 7c is a spring 8b which tends to hold the connecting member 8 toward the knob portion 9b, thus providing a connection between the crankshaft 9 and the pitman member 7 which will hold ordinarily but may be readily removed by pressure.

The pitman 7 is reciprocated by means of the crank portion 9a of the crankshaft 9, shown best in Fig. 2 of the drawings. This crankshaft 9, it will be noted, is revolubly mounted in the middle of the door 10 which door is provided with a slot 10a which permits the revoluble movement of the crank portion 9a of the crankshaft 9. This crankshaft 9 extends downwardly past the lower edge of the door 10 and connects with a motor in the motor casing 11, the motor not being shown. The casing 11 is supported relative to the door 10 by means of a supporting member 11a secured to the motor casing 11 and secured to and extending from the door 10, as shown best in Fig. 2 of the drawings, the motor and its connection being of any conventional type and not shown in the drawings. The door 10 is provided on its side adjacent the receptacle 1 with a knob portion 10b which is adapted to enter the enlarged open portions 1b on the end of the member 1, and the portion 10c enters the reduced portion 1c on the member 1, thus providing means for securing the door and receptacle together which is readily removable by raising the door 10 and motor 11 upwardly slightly and then outwardly. This door 10 is also provided with a downwardly extending lug portion 10d for holding the cover 2 down on the receptacle. Thus it will be noted that after the cream is frozen the door is removed by raising the door together with the motor casing 11 upwardly so that the portion 10a will pass through the opening 1b on the member 1 and the portion 8a is raised off of the member 7c and the lug portion 10d raised freeing the cover 2 at the lug end. The member 7 is then removed and the cover 2 removed with the paddle members 3. Then the shiftable paddles 4 together with the supports 5 may be removed and the contents left in position until ready for use.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an ice cream making attachment for mechanical refrigerators, a freezing receptacle provided with a plurality of spaced apart stationary paddle members, a plurality of shiftable paddle members mounted therein between said stationary paddle members, and means for reciprocating said shiftable paddle members, said stationary paddle members and said shiftable paddle members being provided with a plurality of variable size perforations therein, said stationary paddle members being spaced from the bottom of said receptacle.

2. In an ice cream making attachment for mechanical refrigerators, a freezing receptacle, a cover for said receptacle, a plurality of spaced apart paddle members extending from said cover member downwardly to near the bottom of said receptacle and extending laterally therein, a plurality of shiftable paddle members interposed between said stationary paddle members in said receptacle, each of said paddle members being provided with perforations therein, and means for reciprocating said shiftable paddle members between said stationary paddle members, said means including a resilient connecting member connected with said shiftable member at one end.

3. In an ice cream making attachment for mechanical refrigerators, a receptacle, a cover for said receptacle, a plurality of paddle members extending from said cover member downwardly to near the bottom of said receptacle and extending laterally therein, a plurality of shiftable paddle members interposed between said stationary paddle members in said receptacle, each of said paddle members being provided with perforations therein, means for reciprocating said shiftable paddle members between said stationary paddle members, said means including a resilient connecting member connected with said shiftable member at one end, and a crankshaft connected with said resilient means.

4. In an ice cream making attachment for mechanical refrigerators, a receptacle, a cover for said receptacle, a plurality of paddle members extending from said cover member downwardly to near the bottom of said receptacle and extending laterally therein, a plurality of shiftable paddle members interposed between said stationary paddle members in said receptacle, each of said paddle members being provided with perforations therein, means for reciprocating said shiftable paddle members between said stationary paddle members, said means including a resilient connecting member connected with said shiftable member at one end, a crankshaft connected with said resilient means, a door for the ice making compartment of a mechanical refrigerator in which said crankshaft is mounted, and means in connection with said door and said receptacle for readily connecting and disconnecting said door from said receptacle.

5. In an ice cream making attachment for mechanical refrigerators, a receptacle, a cover for said receptacle, a plurality of paddle members extending from said cover member downwardly to near the bottom of said receptacle and extending laterally therein, a plurality of shiftable paddle members interposed between said stationary paddle members in said receptacle, each of said paddle members being provided with perforations therein, means for reciprocating said shiftable paddle members between said stationary paddle members, said means including a resilient connecting member connected with said shiftable member at one end, a crank shaft connected with said resilient means, a door for the ice making compartment of a mechanical refrigerator in which said crankshaft is mounted, means in connection with said door and said receptacle for readily connecting and disconnecting said door from said receptacle, and a motor casing depending from said door.

6. In an ice cream making attachment for mechanical refrigerators, a rectangular shaped receptacle open at its upper side and provided with an offset flanged upper edge, a cover for said receptacle supported on said offset portion inside of said flanged portion, a plurality of perforated paddle members depending from said cover member, a plurality of shiftable paddle members interposed between said stationary paddle members and between said stationary paddle members and the ends of said receptacle, one of said shiftable paddle members provided with a socket member.

7. In an ice cream making attachment for mechanical refrigerators, a rectangular shaped receptacle open at its upper side and provided with an offset flanged upper edge, a cover for said receptacle supported on said offset portion inside of said flanged portion, a plurality of perforated paddle members depending from said cover member, a plurality of shiftable paddle members interposed between said stationary paddle members and between said stationary paddle members and the ends of said receptacle, one of said shiftable paddle members provided with a socket member, a resilient pitman member provided with an enlarged portion adapted to fit said socket member.

8. In an ice cream making attachment for mechanical refrigerators, a rectangular shaped receptacle open at its upper side and provided with an offset flanged upper edge, a cover for said receptacle supported on said offset portion inside of said flanged portion, a plurality of perforated paddle members depending from said cover member, a plurality of shiftable paddle members interposed between said stationary paddle members and between said stationary paddle members and the ends of said receptacle, one of said shiftable paddle members provided with a socket member, a resilient pitman member provided with an enlarged portion adapted to fit said socket member, and a crank connecting member connected with said resilient pitman member.

9. In an ice cream making attachment for mechanical refrigerators, a rectangular shaped receptacle open at its upper side and provided with an offset flanged upper edge, a cover for said receptacle supported on said offset portion inside of said flanged portion, a plurality of perforated paddle members depending from said cover member, a plurality of shiftable paddle members interposed between said stationary paddle members and between said stationary paddle members and the ends of said receptacle, one of said shiftable paddle members provided with a socket member, a resilient pitman member provided with an enlarged portion adapted to fit said socket member, a crank connecting member connected with said resilient pitman member, and means for operating said pitman member.

10. In an ice cream making attachment for mechanical refrigerators, a freezing receptacle provided with a plurality of spaced apart stationary paddle members, a plurality of shiftable paddle members mounted therein between said stationary paddle members, and means for reciprocating said shiftable paddle members, said stationary paddle members being spaced from the bottom of said receptacle.

11. In an ice cream making attachment for mechanical refrigerators, a freezing receptacle, a cover for said receptacle, a plurality of spaced apart paddle members extending from said cover member downwardly to near the bottom of said receptacle and extending laterally therein, a plurality of shiftable paddle members interposed between said stationary paddle members in said receptacle, and means for reciprocating said shiftable paddle members between said stationary paddle members, said means including a resilient connecting member connected with said shiftable member at one end.

RALPH D. LACOE.